United States Patent [19]

Gilligan et al.

[11] 4,202,014
[45] May 6, 1980

[54] PULSE MODULATED AUTOMATIC LIGHT CONTROL

[75] Inventors: Lawrence H. Gilligan; James E. Hermansdorfer, both of Charlottesville, Va.

[73] Assignee: Sperry Corporation, New York, N.Y.

[21] Appl. No.: 924,261

[22] Filed: Jul. 13, 1978

[51] Int. Cl.² ............................................. H04N 5/26
[52] U.S. Cl. .................................................. 358/228
[58] Field of Search ................................ 358/211, 228

[56] References Cited
FOREIGN PATENT DOCUMENTS 2143120  3/1973  Fed. Rep. of Germany ........... 358/228

Primary Examiner—Robert L. Richardson
Attorney, Agent, or Firm—Howard P. Terry

[57] ABSTRACT

A device for automatically controlling the intensity of light impinging on the face plate of a television camera includes a shutter which is operated through a pulse width modulator so as to be opened for a length of time which varies inversely with the intensity of light entering the imaging light path between the scene and the camera.

3 Claims, 1 Drawing Figure

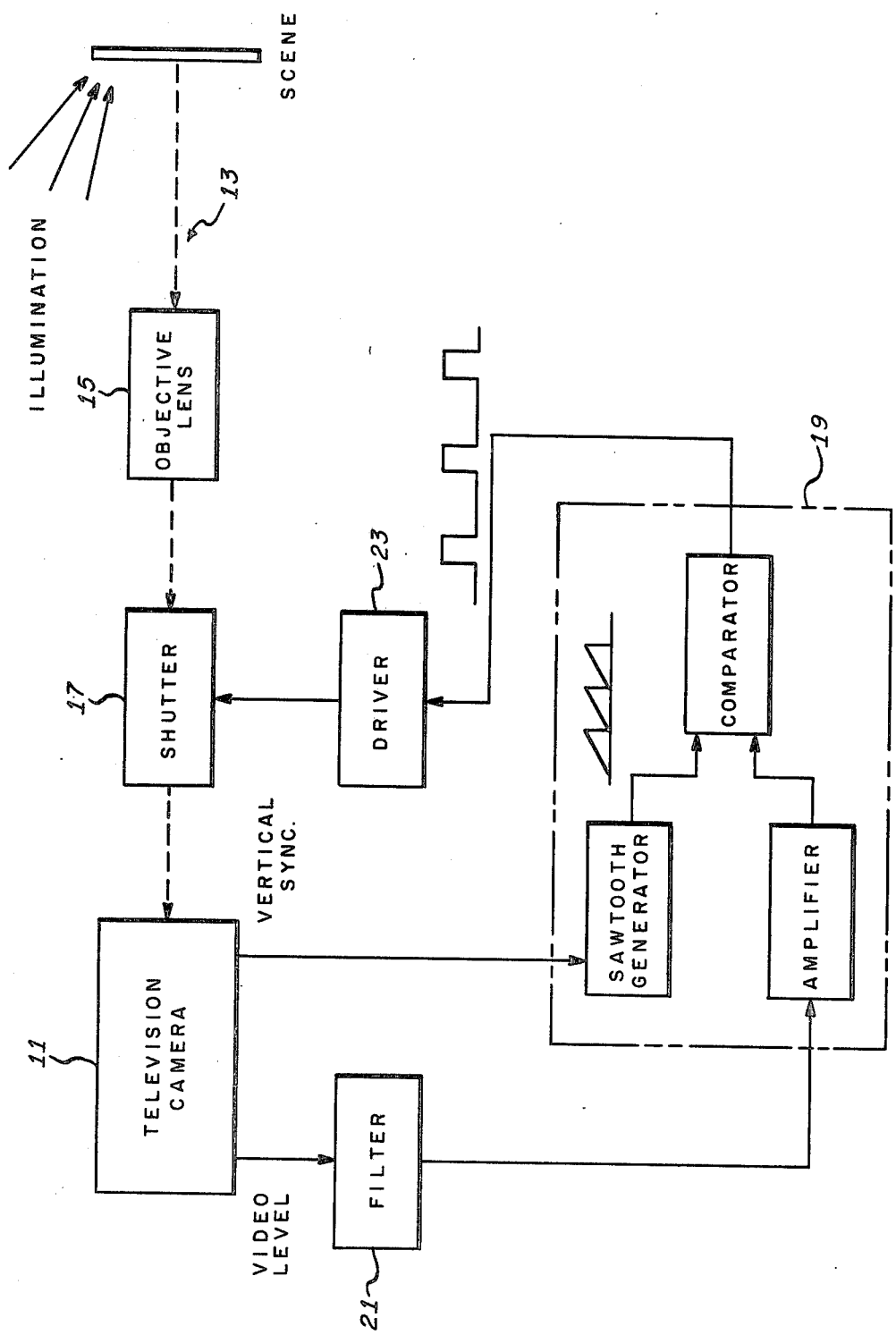

PULSE MODULATED AUTOMATIC LIGHT CONTROL

BACKGROUND OF THE INVENTION

1. Field of the Invention

This invention relates to television cameras and more specifically, to automatic light control systems for such cameras.

2. Description of the Prior Art

In many instances, it is desirable to provide automatic light control systems for use with television cameras. Such systems are particularly advantageous for use with so-called low light level television cameras.

Presently known systems use a mechanical device for controlling the light level impinging on the face plate of the television camera. In many of the prior art devices, for instance, a motor driven iris is adjusted to compensate for changes in total scene illumination.

In other prior art devices, the position of a neutral density filter wedge is adjusted to compensate for changes in total scene illumination. Since either type of device requires continual adjustment during normal operation, friction and wear limit the performance characteristics and life of the system. Furthermore, since the presently known systems all function by changing the total incoming light level, a moving scene may produce smear during the frame time of the camera.

SUMMARY OF THE INVENTION

The invention provides means for automatically controlling the light level impinging on the face plate of a television camera by varying the time that total scene illumination is permitted to pass through the optical system.

BRIEF DESCRIPTION OF THE DRAWING

The single drawing is a block diagram useful in describing the invention.

DESCRIPTION OF THE PREFERRED EMBODIMENT

Referring now to the drawing, a conventional television camera 11 receives light from an illuminated scene along an imaging path 13 which passes through the objective lens 15 and a shutter 17 so as to impinge upon the face plate of the television camera. The objective lens 15 is a conventional device. As presently preferred, the shutter 17 includes a voltage-variable birefringence crystal in which the optical transmissivity may be adjusted by electrical means. Such devices are commercially available. The "PLTZ Intensity Controller", marketed by the Laikin Optical Corporation of Los Angeles, Cal., for instance may be used in the shutter 17. By applying suitable voltages to such devices, the polarization of light passing through the divice may be rotated so as to vary the optical transmissivity throughout a range between a specified maximum and minimum valve.

In the circuit of the present invention, the transmissivity of the shutter is driven between specified high and low values by the application of variable width, constant amplitude pulses.

As depicted in the FIGURE, the circuit for adjusting the transmissivity of the shutter includes a pulse width modulator 19 which is connected to receive the vertical synchronizing signal from the television camera, and the video level signal from the camera through a low pass filter 21.

As is known to those skilled in the art, television cameras include means for producing a vertical synchronizing pulse to initiate each scanning cycle. Similarly, television cameras also contain means for producing a video level signal representative of the white-level content of the portion of the scene being scanned at any given time. In the circuit of the invention, the video level signal is applied to a low pass filter 21 which averages the white-level content of the scene and thus converts the picture information into an analog signal representing the total light in the scene. The resulting d.c. signal is also applied to the pulse width modulator 19. The pulse width modulator is triggered by the vertical synchronizing signal so as to initiate an output pulse in response to that signal. The modulator is further constructed to maintain the output pulse for a time dependent upon the d.c. level of the signal from the filter 21.

Typically, as depicted in the FIGURE, a pulse width modulator contains a function generator arranged to produce a sawtooth wave form synchronized to the television vertical frame rate. An amplifier receives a feedback analog voltage representative of the video level from the filter 21 so as to provide a d.c. voltage of suitable level to a voltage comparator which also receives the sawtooth wave from the function generator. As presently preferred, commercially available integrated circuit devices may be used for each of these components. A Signetics Corporation catalog #555 function generator, for instance, may be used to generate the sawtooth wave, whereas a National Semiconductor Company catalog #LM-741 operational amplifier and a National Semiconductor Company catalog #LM-311 voltage comparator may be used for the amplifier and comparator, respectively.

During operation, the vertical synchronizing pulses from the television camera initiate each triangular pulse in the sawtooth wave generator. The voltage from the filter 21, which is proportional to scene brightness, is processed in the amplifier to adjust its gain and absolute d.c. voltage level. The sawtooth wave and the amplifier output voltage are compared in the comparator. When the vertical synchronizing signal initiates a sawtooth pulse, the comparator is in its high output state. When the sawtooth wave reaches the level of the amplifier output voltage, the comparator switches to its low output state. Thus, the relative length of time that the comparator remains in the high output state is proportional to the ratio of analog voltage to sawtooth voltage amplitude.

Effectively, the pulse width modulator produces a train of output pulses having a pulse repetition rate synchronized with the vertical scanning rate of the camera and a duty cycle representative of the average light intensity of the scene being televised.

The rectangular output wave from the pulse width modulator is applied to a conventional driver circuit 23 which converts the signal from modulator into a corresponding signal having voltage and current levels suitable for driving the particular shutter being used.

As is known in the art, a typical television camera contains a camera tube having a face plate on which is formed a matrix of photosensitive elements. Light from a scene being televised passes along the imaging path 13 and activates the individual photosensitive elements in the matrix in accordance with the intensity of light reflected from the individual elements in the scene. An electron beam repetitively scans the matrix and produces a video signal corresponding to the charge accumulated on the individual photosensitive elements. Typically, television cameras are adjusted so that the matrix is scanned thirty times per second and each scan is initiated by a vertical synchronizing signal.

Consider now the operation of the circuit of the invention. Operation is commenced when a vertical synchronizing signal in the television camera initiates a scanning cycle. The same signal triggers the pulse width modulator and initiates an output pulse which drives the shutter to its high transmissivity state. As the scanning progresses, the camera produces a video level signal which passes through the filter 21 so as to provide a signal representing the average white-level content of the scene. The resulting signal from the filter is applied to the pulse width modulator wherein it acts to reset the modulator and thus terminate the output pulse from the modulator as a function of the total light being received. The modulator is adjusted so that under conditions of relatively high light intensity, the level of the signal from the filter 21 is such that the modulator is reset quickly so as to produce a relatively short output pulse and thus to permit the shutter to remain in its high transmissivity state for a small fraction of the scanning cycle. For progressively lower light levels, the signal from the filter 21 permits the modulator to remain in its triggered state for progressively longer periods of time and thus to retain the shutter in its high transmissivity state for greater portions of the scanning cycle. In general, the width of the pulses produced by the modulator, and therefore the time in which the shutter is held in its high transmissivity state is an inverse function of the intensity of the light reaching the television camera.

Although under most conditions the shutter is maintained in its high transmissivity state for less than a complete scanning cycle, under conditions of extremely low light intensity, the shutter may remain in the high transmissivity state for a period of time exceeding a single scan cycle. Under these conditions, the signal is merely integrated and stored until the information from the next scanning cycle is read out.

Although the shutter has been described as an electro-optic device, it will be appreciated that in some applications a magneto-optic device may be preferred for this purpose. Under such circumstances, the driver element 23 ordinarily would take the form of a high current drive circuit rather than a high voltage drive circuit as in the case with the voltage-variable birefringence crystal shutter previously described.

Furthermore, it will be appreciated that although the FIGURE illustrates a device in which the shutter is interposed between the television camera and the objective lens, the shutter may be placed between the objective lens and the scene, if desired.

From the foregoing it can be seen that whereas the prior art devices operate by reducing the light intensity reaching the camera so as to integrate the received information for a definite amount of time but to a reduced level, the circuit of the present invention integrates received information to the full level but for shortened periods of time.

Furthermore, the system of the invention allows the television camera to use faster shutter speeds for higher light levels and image smear is minimized.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An automatic light control for a television camera comprising voltage-variable birefringence crystal shutter means for controlling the average intensity of light reaching said camera, and means for adjusting the transmissivity of said shutter means in response to an electrical signal, said transmissivity adjusting means including a pulse width modulator connected to initiate a pulse in response to a vertical synchronizing signal produced in said camera and to maintain the pulse for a length of time that varies inversely with the magnitude of the video level signal produced in said camera, said pulse width modulator being coupled to the shutter means so as to switch the shutter means to a specified high transmissivity state during the occurrence of an output pulse and to maintain the shutter in a specified low transmissivity state in the absence of an output pulse.

2. The automatic light control system of claim 1 wherein the pulse width modulator is coupled to the shutter means through a high voltage driver circuit.

3. An automatic light control system for a television camera comprising voltage-variable birefringence crystal shutter means for controlling the average intensity of light reaching the camera from the scene being televised, a pulse width modulator connected to receive the vertical synchronizing signals from said camera at the inception of each scanning cycle, said pulse width modulator being arranged to be triggered into a "set" state by each synchronizing signal and thereby to initiate an output pulse, low pass filter means connected to receive the video level signals from said camera and constructed to provide an output signal representative of the average value of said video signal, said pulse width modulator being connected to receive the output voltage from said filter, said pulse width modulator further being constructed and arranged to maintain the output pulse for a length of time that varies inversely with the magnitude of the control signal, and driver circuit means for coupling the output signal from the pulse width modulator to the shutter means.

* * * * *